(12) United States Patent
Kryeziu

(10) Patent No.: US 6,938,047 B2
(45) Date of Patent: Aug. 30, 2005

(54) METHODS, DATA STRUCTURES, AND SYSTEMS FOR PROCESSING MEDIA DATA STREAMS

(75) Inventor: Arben Kryeziu, Wailuku, HI (US)

(73) Assignee: Maui X-Stream, Inc., Lahaina, HI (US)

(*) Notice: Subject to any disclaimer, the term of this patent is extended or adjusted under 35 U.S.C. 154(b) by 226 days.

(21) Appl. No.: 10/369,017

(22) Filed: Feb. 19, 2003

(65) Prior Publication Data

US 2004/0162910 A1 Aug. 19, 2004

(51) Int. Cl.[7] .............................................. G06F 17/30
(52) U.S. Cl. ...................................... 707/101; 707/102
(58) Field of Search ......................... 707/10, 101, 102, 707/104.1; 341/50; 348/460; 370/537; 386/112; 709/200, 203, 231, 233; 710/65; 715/500.1

(56) References Cited

U.S. PATENT DOCUMENTS

| | | | |
|---|---|---|---|
| 6,271,892 B1 | 8/2001 | Gibbon et al. ............... | 348/700 |
| 6,501,794 B1 | 12/2002 | Wang et al. ............ | 375/240.08 |
| 6,801,968 B2 * | 10/2004 | Hunter ......................... | 710/65 |
| 2002/0144276 A1 | 10/2002 | Radford et al. ................ | 725/87 |
| 2003/0061369 A1 * | 3/2003 | Aksu et al. .................. | 709/231 |
| 2004/0003102 A1 * | 1/2004 | DuVall et al. ............... | 709/231 |
| 2004/0032348 A1 * | 2/2004 | Lai et al. ....................... | 341/50 |
| 2004/0051812 A1 * | 3/2004 | Hayward .................... | 348/460 |

FOREIGN PATENT DOCUMENTS

WO    WO-0227659 A2    4/2002

OTHER PUBLICATIONS

WebRef, A Streaming Media Jukebox, Oct. 25, 1999, http://www.webreference.com/js/column51/, pp. 1–14.*
Merz et al., Iterative Transmission of Media Streams, 1997, ACM, pp. 283–290.*
"MPEG–4 Overview, V.21—Jeju Version", *International Organisation for Standardisation*, ISO/IEC JTC 1/SC29/WG11 N4668, Koenen, R., (ed.),(Mar., 2002), 60 p.
Houchin, J. S., et al., "File Format Technology in JPEG 2000 Enables Flexible Use of Still and Motion Sequences", *Signal Processing: Image Communication, 17*, (2002),131–144.

* cited by examiner

*Primary Examiner*—Apu Mofiz
(74) *Attorney, Agent, or Firm*—Schwegman, Lundberg, Woessner & Kluth, P.A.

(57) ABSTRACT

Methods, media data structures, and systems are provided for compressing, streaming, and playing media data. Data sections for frames of media data are compared, and similar data sections are stored once in a compressed media data. A meta data structure maps each similar data section in the compressed media data to its appropriate frame in the media data. A media player that is self-loading and executing is transmitted to a recipient. In one embodiment, the media player detects a network data transmission rate and configures accordingly. Next, the media player requests the meta data structure and the compressed media data and automatically begins receiving, decompressing, and playing the frames of the media data.

15 Claims, 2 Drawing Sheets

METHODS, DATA STRUCTURES, AND SYSTEMS FOR PROCESSING MEDIA DATA STREAMS

TECHNICAL FIELD

Embodiments of the present invention relate generally to media streaming, and more particularly to compressing, decompressing, and playing media data.

BACKGROUND INFORMATION

Transmitting media data (e.g., audio, video, graphic, image, and the like) over a network has become commonplace in today's highly connected and wired economy. Consumers and organizations consume large quantities of network bandwidth and other computing resources when receiving and playing media data. Consequently, a variety of techniques have been attempted to manage and alleviate bandwidth and resource consumption when acquiring and playing media data.

For example, when media data initially became available over network connections, the solution was primarily to upgrade network connections to T1, fiber optics, cable, Digital Subscriber Line (DSL), cable, broadband, and others. The solution was geared towards hardware connections having more bandwidth capabilities for handling the load associated with transmitting media data over a network. However, data transmission rates can only being improved if both the sender and recipient have a high bandwidth network connection. Thus, transmission rates are tied to the least common denominator connection in a sender-recipient relationship.

Accordingly, solutions evolved to more of a software focus in addition to higher bandwidth network connections. One such solution is referred to as media streaming. With this technique, a sender breaks the media data up into packets and serially transmits the individual packets over the network to a recipient. The recipient uses additional streaming software to buffer a predefined amount of media data before the media data is played. Once the media data begins playing, the recipient usually experiences a continuous play of the media data, since as the recipient consumes some of the media data; the buffered amount of data is being replaced with new media data that has yet to be consumed.

Higher bandwidth network connections and streaming techniques remain the preferred method of delivering and consuming media data over a network. However, before a recipient can actually consume the media data, the recipient needs to download and install a media player on the recipient's computing device. These media players are readily available over the Internet through a World Wide Web (WWW) browser. A few examples include Microsoft's Windows Media Player, Apple's QuickTime Media Player, Real Network's Real Players, and others.

Each of the commercially available media players generally requires registration and in some instances may require a restart of a computing device that downloads a media player. Some actually continually solicit a recipient to upgrade to a paid version of the media player with presumably more features and online support. The electronic solicitations can become annoying to the recipient, as well as pop-up advertisements that are displayed each time a recipient uses the media player. Moreover, in a business environment, it is generally not desirable for each individual employee to download free software (freeware) on his/her computer. This is so, because the freeware is not supported and can cause unexpected failures or other issues related to desktop management, such as maintenance, support, and upgrades.

Thus, downloading, installing, and using a media player can be time consuming, prohibited (in some environments), and annoying. Additionally, a large portion of Internet users still have standard dial-up connections to the internet and do not have high bandwidth equipment and/or service providers. Therefore, their network connections still make media streaming a challenging and frustrating task, since there is large startup latencies before the media data is buffered and played on their computing devices. As a result, many Internet users elect not to consume media data at all.

Attempts have been made to alleviate this situation by compressing the media data when streamed from the sender and decompressing the media data when consumed by the user. But, even the best conventionally available media compression/decompression techniques have not appreciably remedied the problem for low bandwidth Internet users.

Therefore, there is a need for improved implementations and techniques for distributing media players, compressing media data, and playing media data. These implementations and techniques should permit low bandwidth Internet users to consume media data in a more time efficient manner without the need to install a proprietary media player.

SUMMARY OF THE INVENTION

Figure 1:
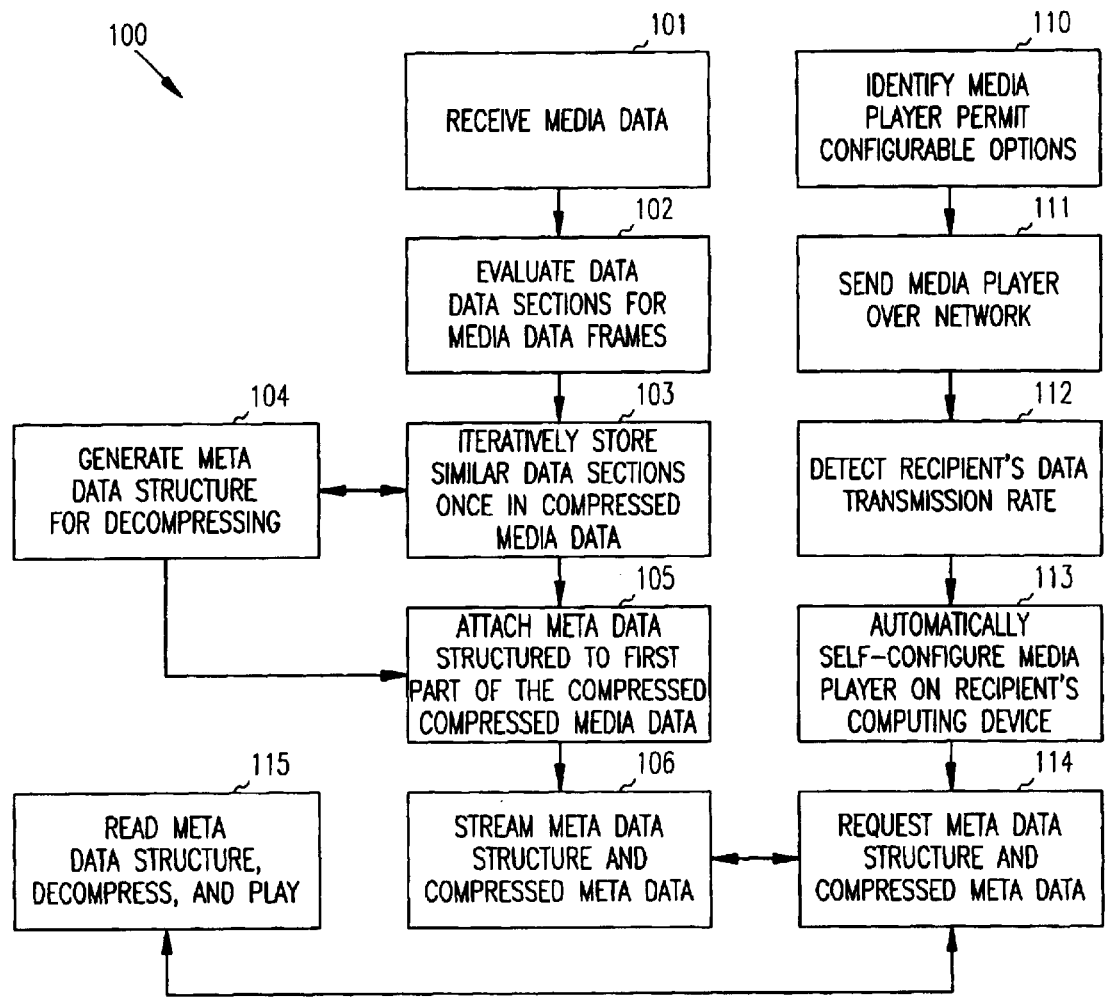
FIG. 1 is a flow diagram of a method for processing media data, in accordance with one embodiment of the invention.

In various embodiments of the present invention, techniques for processing media data are presented. Media frames for media data are evaluated as data sections. Similar data sections are stored in a compressed media data once. A meta data structure provides a mapping for decompressing the compressed media data into populated media frames associated with the original media data. A media player that is self-playing and self-executing is sent over a network to a requesting recipient. The media player configures and acquires the meta data structure with the compressed media data. Next, the media uses the meta data structure and the compressed media data to decompress and play the media data for the recipient.

More specifically and in one embodiment of the present invention, a method to process media data is described. Data sections for media data frames of media data are evaluated. Next, similar data sections are iteratively stored as a single data section for a compressed media data. A meta data structure is generated to identify associations for each of the data sections in the single data section with respect to the media data frames to which the similar data sections are associated. Finally, a media player, the meta data structure, and the compressed media data are streamed over a network.

DESCRIPTION OF THE EMBODIMENTS

Novel methods, data structures, and systems for processing media data are described. In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them, and it is to be understood that other embodiments may be utilized and that structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

As used herein the phrase "media data" includes data that is related to multimedia such as, by way of example only, audio, video, graphical, image, text, and combinations of the same. Streaming refers to breaking media data up into configurable byte chunks, blocks, or frames and serially transmitting these pieces over a network to a one or more recipients' computing devices. The network can be hard-wired (e.g., direct (point-to-point), indirect (e.g., Wide Area Network (WAN), such as the Internet), and others). The network can also be wireless (e.g., Infrared, Radio Frequency (RF), Satellite, Cellular, and others). Furthermore, the network can be a combination of hardwired and wireless networks interfaced together.

A sender is a media data content provider. This can be an organization, a government, an individual, or automated applications acting on behalf of one of these entities. A recipient can be the same entities as a sender, but recipients are consumers of the media data. Thus, depending upon the transaction being performed (e.g., sending or consuming) the roles of a sender and recipient can be interchangeable, such that in one transaction a sender is also a recipient, and a recipient is also a sender.

A media player is one or more software applications that are designed to receive, decompress, if necessary, decrypt, if necessary, and play media data in a recipient's computing environment. Media players can be any existing available media player designed and modified to automatically load, configure, and process media data according to the teachings of the present disclosure, or a custom-developed media player designed to achieve the same. In one embodiment of the present invention, the media player is a JAVA applet that can be downloaded, loaded, and executed within an application of a recipient's computing device (e.g., WWW browser, and others) without any manual intervention.

The initial media data that is processed by various embodiments of the present invention can be in any existing media data format. Thus, this format can be Moving Picture Expert Group (MPEG) format, an Audio Video Interleaved (AVI) format, and a Quicktime Movie Format (MOV). The media data format can also be encrypted for purposes of validation or can itself be in a compressed format.

Data sections refer to attributes (e.g., color, dimensions, resolution, and the like) associated with portions of a media data frame. Media data includes a plurality of frames, when these frames are pieced together in the correct order and continuously played by a media player within an application; the recipient experiences a full and continuous play of the media data. Thus, media data includes many frames and each frame can be broken into a plurality of data sections having data attributes.

FIG. 1 illustrates a flow diagram of a method 100 for processing media data, in accordance with one embodiment of the invention. Method 100 is implemented by one of more software applications on computer accessible media and is executed by a computing device (e.g., any device having processing and memory capabilities). Furthermore, a sender uses method 100 in the sender's computing environment in order to stream media data and a media player to a recipient's computing device over a network. In turn, the recipient uses the media player to consume the streamed media data.

At 101, media data is received or identified for processing to a recipient over a network. As previously presented, the native media data format can be of any format (e.g., MOV, AVI, MPEG, custom developed, and others). The media data format can also be compressed and/or encrypted.

The media data is received or identified when a request is received from a recipient to consume the media data. In some embodiments, a specific request may not be needed since automated processes can automatically trigger or generate a request to stream the media data to the recipient.

At 102, each frame of the media data is evaluated by data section. The size of the data section is configurable within method 100. The evaluated data sections are data attributes associated with a media frame. These attributes include by way of example only, color attributes, dimensional attributes, resolution attributes, and others. When evaluating, comparisons are made to previous processed data sections against current processed data sections to determine data sections that are similar (e.g., having similar data attributes). Data sections can be similar if they are identical or if their data attributes are substantially similar. What is substantially similar can be configured within method 100 in order to produce better quality or less quality for the media data when it is subsequently played for a recipient.

At 103, the media data is iteratively processed by method 100 to locate similar data sections within each frame for the media data. As similar data sections are detected from previously processed data sections, these similar data sections are not stored a second time in a compressed version of the media data that is being iteratively generated by method 100. Thus, similar data sections are stored once in the compressed media data. When processing a first data section for the media data there is no need to do the evaluation at 102, rather the first data section is stored as is in the compressed media data. However, for all data sections processed after the first data section, there can be one or more similar data sections detected. In these circumstances, these similar data sections are not stored a second time in the compressed media data.

As the processing at 103 proceeds a meta data structure at 104 is generated for the compressed media data that is being iteratively constructed. The meta data structure provides a mapping for each similar data structure that identifies its serial location within the native media data being compressed. Thus, a single data section can have a plurality of mappings that indicate this particular data section is associated with a plurality of media data frames in the original media data. In one embodiment, the meta data structure is a character string having numerical positional values that provide the appropriate mappings for similar data sections in the compressed media data. Of course as one of ordinary skill in the art appreciates, any data structure providing the appropriate mappings from the compressed media data to the original media data can be used to achieve the tenets of the present disclosure. Thus, all such meta data structures are intended to fall within the broad scope of the present invention.

Once the media data is represented by the meta data structure and the compressed media data, the meta data structure is affixed to a first part of the compressed media data to represent one continuous string of data that will then be streamed to a recipient over a network at 105.

Concurrent or in parallel to the processing described at 101 through 105, method 100 is readying a media player for delivery to the recipient over the network. Thus, at 110, a media player is identified for a recipient's computing environment. In some embodiments, this media player can be actively selected and configured by the recipient. For example, a recipient may request the media data via a WWW browser over a network that is the Internet. During this request, the recipient will be asked to select the media player desired or to provide other configurable options that may not be automatically obtainable from the Uniform Resource Locator (URL) request data received from the recipient, such as Random Access Memory (RAM) capabilities, browser applet capabilities, browser type (e.g., Netscape, AOL, Internet Explorer, and others).

At 111, the media player is configured based on automatic or manual information supplied by the recipient or the recipient's URL request data, and the media player is transmitted to the recipient over the network. The media data player is written in an interpretive language, such that the software code is self-executing requiring no advance compiling or static linking to produce an executable version of the media player. Moreover, the media player is designed to automatically load and execute one fully downloaded to the recipient's computing environment. One example implementation, of such as software module, is a media player written as an applet, such as a JAVA applet that can self-load and self-execute within applications that support Java applets. Most existing WWW browser will support JAVA applets. Of course any media player written as a self-executing and self-loading application applet can be used to achieve the tenets of the present invention. All such implementations are intended to fall within the broad scope of the present invention.

When the media player is loaded and automatically executed, the media player detects, at 112, a network data transmission rate supported by the recipient's computing environment and configures accordingly at 113. The data transmission rate of the recipient's computing environment permits the media player to know how much buffer space and how much compressed media data can be streamed from the sender to the recipient to permit continuous media play. In some embodiments, this configuration can occur when the recipient selects or configures the media player at 110, and therefore, in these embodiments, no detection or configuration is needed at 112 and 113.

At 114, the media player automatically contacts the sender and identifies the preferred chunks of data that the compressed media data should be broken into when streaming the compressed media data to the recipient. In response to this, method 100 streams the meta data structure with the first chunk of compressed media data. The media player then grabs the meta data structure, reads the mappings, and buffers the first chunk of compressed media data on the recipient's computing device. Once the initial buffer is full, the media player reads the meta data structure, decompresses the compressed media data from the buffer, and plays the uncompressed media data on the recipient's computing device.

Processing at 106, 114, and 115 continues in parallel and continuously until all the compressed media data is received at the recipient's computing device and decompressed and played by the media player.

Moreover, in some embodiments, the processing depicted at 101–105 can be performed in batch and readily available to a requesting media player at 114. Thus, the meta data structure and the compressed media data can be natively stored in a location readily accessible to the sender's computing environment. This may be particularly beneficial for content providers that regularly deliver media data with method 100. It may also be beneficial for recipients that use a content provider as a data warehouse for their media data content.

One of ordinary skill in the art now appreciates upon reading the descriptions of various embodiments presented above how media data can be more efficiently processed than what has previously been available in the industry. Now recipients need not hassle with downloading and installing proprietary and nuisance media players. Moreover, now recipients with low bandwidth network connections can experience media play in a more time efficient manner, since the compression techniques of the present invention permit the size of the original media data to be substantially reduced over what has been available in the industry. Moreover, even recipients with higher bandwidth network connections can experience more time efficient media play, since the initial startup latency associated with media play is reduced with the tenets of the present disclosure.

Figure 2:
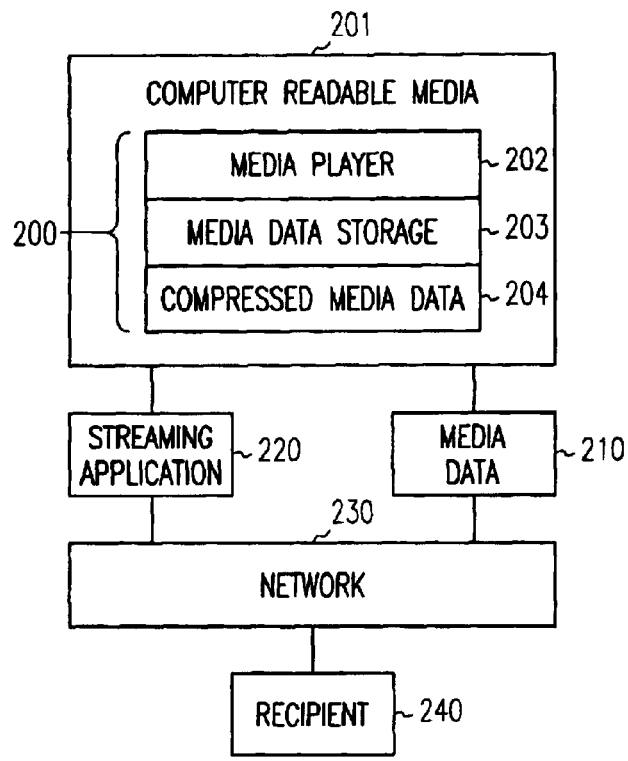
FIG. 2 is a diagram depicting a media data structure, in accordance with one embodiment of the invention.

FIG. 2 illustrates a diagram depicting a media data structure 200, in accordance with one embodiment of the invention. The media data structure 200 resides in one or more computer readable media 201. It is not required that the media data structure 200 be contiguously stored on a single computer readable medium 201, since one of ordinary skill in the appreciates that the media data structure 200 can be logically assembled and acquired from a plurality of disparate locations and computer readable media 201.

A sender of media data or a media data content provider uses the media data structure 200. The media data structure 200 includes a media player 202, a meta data structure 203, and compressed media data 204. The media data structure 200 is a wholly contained data structure 200 that can be used to more efficiently play and stream media data 210. The data structure 200 permits media data 210 to be automatically played and compressed to smaller data sizes. Thus, there is no need for downloading, installing, and restarting a computing device before the media data 210 can be played on a computing device. Moreover, the smaller compressed media data 204 permits reduced startup latency before the media data 210 is played.

The compressed media data 204 represents data sections from media frames of the media data 210 where similar data sections are stored once. The size of the data sections and the data attributes that define the data sections are configurable attributes of a method generating the media data structure 200. As an example, the data section can include color attributes, pixel attributes, resolution attributes, audio attributes, and others.

The meta data structure 203 provides a mapping from the compressed media data 200 to an uncompressed version of the media data 210. In some embodiments, this mapping is a string of numeric characters that identify the locations and/or frames of each singly stored data section as it is associated in the original media data 210.

The media player 202 is a self-loading, self-executing, and self-configuring application. The media player 202, in some embodiments, requires no intervention or configuration to process. Thus the media player 202 can automatically detect the data transmission rates of a processing computing device, the application using the media player 202, and the like. In other embodiments, the media player 202 is configurable and permits manual adjustments for things such as application using the media player 202, network data transmission rates, and other attributes or characteristics of a receiving computing device.

The compressed media data 204 can be broken into configurable byte sizes. The media player 202, in some embodiments, provides the configurable byte sizes based on the network data transmission rate of a receiving computing device. Moreover, in some embodiments, a streaming application 220 supplies the compressed media data 204 in the desired byte sizes over a network 230 to an intended recipient's computing device 240.

In one embodiment of data structure 200, a request is received from a recipient 240 to acquire and consume media data 210. The media player 202 is identified and optionally configured for the recipient's computing device and transmitted over the network 230 to the recipient 240. The media player 202 self-loads and starts processing without intervention on the recipient's computing device. The media player 202, then optionally detects the recipient's network data transmission capabilities to select an optimal block size to transmit the compressed media data 204 over the network 230 to the recipient 240. Next, the media player 202 automatically configures and requests the first block of compressed media data 204 over the network 230. The first block includes as a first part of the block the meta data structure 203. The media player 202 uses the meta data structure 203 to decompress and automatically play the media data 210 on the recipient's computing device.

In other embodiments, the meta data structure 203 and the media player are sent together to the recipient 240 before any portion of the compressed media data 204 is streamed by the streaming application 220 over the network 230 to the recipient 240. In still other embodiments, an initial default block size of data is used to stream the media player 202, the meta data structure 203, and a first portion of the compressed media data 204 over the network 230 to a recipient 240. In other embodiments, the recipient 240 may have previously used a media data structure 200 through a previous contact with a sender of content provider of media data 210. In these embodiments, the media player 202 may be permitted to reside within an application of the recipient and may therefore already exist. Correspondingly, the media player 202 will not need to be resent to the recipient 240.

One now understands how media data structure 200 functionally provides significant advantages over what has been conventionally achieved in the industry. More specifically, media data 210 can now be substantially compressed as compressed media data 204 permitting media data 210 to be more rapidly transmitted over a network 230 and consumed by a recipient 240. Furthermore, media player 202 is included within the media data structure 200 such that a recipient need not acquire, download, install, and possibly reboot an application before the recipient can consume the media data 210.

Figure 3:
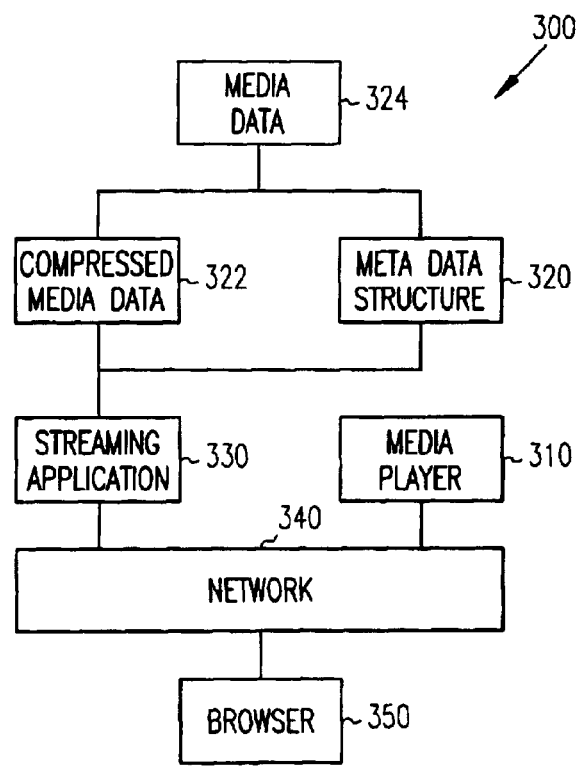
FIG. 3 is a diagram of a media data processing system, in accordance with one embodiment of the invention.

FIG. 3 illustrates a diagram of a media data processing system 300, in accordance with one embodiment of the invention. The media data processing system 300 is implemented as one of more software applications within a computing processing environment. The media data processing system 300 includes a media player 310, a meta data structure 320, and a streaming application 330.

The media player 310 is implemented as one or more software applications and written in an interpreted software programming language, such that the media player 310 is capable of self-executing without the need to compile or statically link to other modules. In one embodiment, the media player 310 is written as a JAVA applet that is self-loaded, self-executed, and self-configured within a browser.

The meta data structure 320 is a mapping between a compressed version of media data 322 and an original processed media data 324. The mapping identifies positional information for data sections that are singularly stored in the compressed media data 322 as they are to be presented in the media data 324 when the media data is decompressed. Similar data sections are stored once in the compressed media data 322. Similar data sections will map via the meta data structure 320 to specific frames included in the media data 324.

The streaming application 330 first or initially transmits the media player 310 over a network 340 to a browser application 350. The media player 310 will then self-load, self-execute, and self-configure, if necessary. The media player 310 then requests from the streaming application 330 the meta data structure 320 and that the streaming application 330 begin transmitting the compressed media data 322 at a configured data block size. The media player 310 executes within the browser 350 and receives the meta data structure 320 and the compressed media data 320. The media player 310 is operable to read and process the meta data structure 320 in order to decompress the compressed media data 322 and play the media data 324 in an uncompressed format.

One now fully appreciates how media data 320 can be more efficiently processed and played over a network, such as the Internet. These techniques permit media players 310 to automatically be transmitted during a consuming session by a recipient. The media players 310 automatically load, execute, and configure and use a meta data structure to decompress a compressed media data 322 in a more efficient manner than what has been achieved in the industry.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A computer-implemented method to process media data, comprising:

evaluating data sections for media data frames of media data;

iteratively storing similar data sections having similar data attributes in a single data section for a compressed media data, and wherein the similar data sections span multiple ones of the media data frames before being stored in the compressed media data as the single data section, and wherein each similar data attribute exists once within the single data section;

generating a meta data structure to identify associations for each of the data sections in the single data section with respect to the media data frames to which the similar data sections are associated; and streaming a media player, the meta data structure, and the compressed media data together over a network; receiving, by a recipient, over the network the media player, the meta data structure, and the compressed media data; and automatically loading and initiating the media player on a computing device of the recipient, wherein the media player automatically executes and reads the meta data structure to decompress and play the compressed media data.

2. The method of claim 1 wherein in generating, the meta data structure includes a numerical position for each similar data section that identifies one of the media frames to which one of the data sections is associated in the media data.

3. The method of claim 1 wherein in streaming, the compressed media data is separated into data blocks and sent over the network a block at a time.

4. The method of claim 1 wherein in evaluating, the media data is already in a compressed format when evaluated.

5. The method of claim 1 wherein in evaluating, the media data is at least one of a Moving Picture Expert Group (MPEG) format, an Audio Video Interleaved (AVI) format, and a Quicktime Movie Format (MOV).

6. A media data structure residing on and implemented within a computer readable medium, comprising:

a compressed portion of media data where similar data sections are stored once as a single data section, and wherein the similar data sections span multiple frames within an uncompressed format of the compressed portion;

a meta data structure used to map each data section of the compressed portion to an appropriate frame for the media data; and a media player that is self-loading and self-extracting on a computing device and which is received on the computing device when the compressed portion of media data is selected or identified and wherein the media player processes the meta data structure to acquire and reproduce the uncompressed format of the compressed portion and automatically plays the media data and wherein the media player automatically detects a data transmission rate of a receiving computing device before acquiring and playing the media data, and wherein the media player automatically loads and executes within a browser of a recipient.

7. The media data structure of claim 6 wherein the compressed portion is broken to configurable sizes of blocks of data.

8. The media data structure of claim 6 wherein a streaming application initially streams the media player over a network followed by the meta data structure, and then each of the blocks serially.

9. The media data structure of claim 6 wherein the media player, the meta data structure, and the compressed portion are streamed over a network where the network is the Internet.

10. The media data structure of claim 9 wherein a Hyper Text Transfer (HTTP) or a HTTP over Secure Sockets Layer (HTPPS) protocol is used to stream the media player, the meta data structure, and the compressed portion over the Internet to the browser.

11. A media data processing system implemented in a computer-readable medium, comprising:

a media player that is adapted to be self-loading and self-executing within a browser when received by a recipient in connection with a recipient selected media data;

a meta data structure that identifies data sections from compressed media data and associates each data section with an appropriate frame of uncompressed media data wherein each data section identified from the compressed media data is mapped within the meta data structure to multiple frames within the uncompressed media data, and wherein the compressed media data is a compressed version of the recipient selected media data and the uncompressed media data is a decompressed version of the recipient selected media data; and a streaming application that first transmits the media player over a network to the browser and is responsive to the media player to transmit the meta data structure and the compressed media data to the browser, wherein the media player automatically loads and executes within the browser and detects a transmission rate for a network connection of the browser and then configures itself and requests the meta data structure and the compressed media data from the streaming application.

12. The media data processing system of claim 11 wherein the compressed media data houses similar data sections for frames of the uncompressed media data once.

13. The media data processing system of claim 11 wherein the streaming application transmits the compressed media data to the browser in configurable data block sizes.

14. The media data processing system of claim 11 wherein the meta data structure is attached as a first string of characters to the compressed media data.

15. The media data processing system of claim 11 wherein the media player is implemented as an executable browser applet.

* * * * *